(12) United States Patent
Seo et al.

(10) Patent No.: US 12,459,872 B2
(45) Date of Patent: Nov. 4, 2025

(54) ARTIFICIAL MARBLE INCLUDING STRIPES HAVING HIGH LIGHT TRANSMITTANCE

(71) Applicant: LX HAUSYS, LTD., Seoul (KR)

(72) Inventors: Junyoung Seo, Seoul (KR); Hongkwan Cho, Seoul (KR); Donghee Kim, Seoul (KR); Yechan Kim, Seoul (KR); Hyewon Kim, Seoul (KR)

(73) Assignee: LX HAUSYS, LTD., Seoul (KR)

( * ) Notice: Subject to any disclaimer, the term of this patent is extended or adjusted under 35 U.S.C. 154(b) by 0 days.

(21) Appl. No.: 18/252,905

(22) PCT Filed: Nov. 26, 2021

(86) PCT No.: PCT/KR2021/017680
§ 371 (c)(1),
(2) Date: May 15, 2023

(87) PCT Pub. No.: WO2022/114867
PCT Pub. Date: Jun. 2, 2022

(65) Prior Publication Data
US 2023/0416165 A1   Dec. 28, 2023

(30) Foreign Application Priority Data

Nov. 27, 2020 (KR) .......... 10-2020-0163210
Dec. 24, 2020 (KR) .......... 10-2020-0183973

(51) Int. Cl.
*B32B 3/10* (2006.01)
*C04B 14/06* (2006.01)
(Continued)

(52) U.S. Cl.
CPC .......... *C04B 41/4826* (2013.01); *C04B 14/06* (2013.01); *C04B 14/22* (2013.01);
(Continued)

(58) Field of Classification Search
None
See application file for complete search history.

(56) References Cited

U.S. PATENT DOCUMENTS

| 5,935,617 A | 8/1999 | Uchida et al. |
| 7,700,682 B2* | 4/2010 | Sekine .......... C03C 3/087 |
| | | 501/72 |

(Continued)

FOREIGN PATENT DOCUMENTS

| CN | 1371814 A | 10/2002 |
| CN | 1669755 A | 9/2005 |

(Continued)

OTHER PUBLICATIONS

Machine translation of KR-1049181-B1 (Year: 2001).*
(Continued)

*Primary Examiner* — Christopher M Polley
(74) *Attorney, Agent, or Firm* — Birch, Stewart, Kolasch & Birch, LLP

(57) ABSTRACT

The present invention relates to an artificial marble including one or more stripe regions and a base region on a first surface of the artificial marble, in which the stripe regions extend into the artificial marble, in which the artificial marble includes a section where a surface of the section corresponding to the first surface of the artificial marble is the stripe region and an inside of the artificial marble in a vertical direction under the stripe region is the base region, and in which at least a part of the base region of the section is visible to a naked eye from the surface of the stripe region.

19 Claims, 5 Drawing Sheets

(51) Int. Cl.
    *C04B 14/22*     (2006.01)
    *C04B 26/18*     (2006.01)
    *C04B 41/00*     (2006.01)
    *C04B 41/45*     (2006.01)
    *C04B 41/48*     (2006.01)
    *C04B 41/63*     (2006.01)
    *B28B 1/00*     (2006.01)

(52) U.S. Cl.
    CPC .......... *C04B 26/18* (2013.01); *C04B 41/0072* (2013.01); *C04B 41/4576* (2013.01); *C04B 41/4578* (2013.01); *C04B 41/63* (2013.01); *B28B 1/005* (2013.01)

(56) References Cited

U.S. PATENT DOCUMENTS

| | | |
|---|---|---|
| 2001/0006116 A1 | 7/2001 | Blazick et al. |
| 2011/0259222 A1 | 10/2011 | Tanaka et al. |
| 2012/0258290 A1 | 10/2012 | Kim et al. |
| 2013/0245156 A1 | 9/2013 | Buskila et al. |
| 2014/0179847 A1 | 6/2014 | Hwang et al. |
| 2016/0221215 A1 | 8/2016 | Grzeskowiak, II et al. |
| 2018/0126673 A1 | 5/2018 | Sanchis Brines et al. |
| 2018/0194164 A1 | 7/2018 | Benito Lopez et al. |
| 2019/0283274 A1 | 9/2019 | Grzeskowiak, II et al. |
| 2021/0229313 A1 | 7/2021 | Rodriguez Garcia et al. |

FOREIGN PATENT DOCUMENTS

| | | | |
|---|---|---|---|
| CN | 1864969 A | 11/2006 | |
| CN | 101642929 A | 2/2010 | |
| CN | 102227312 A | 10/2011 | |
| CN | 102666123 A | 9/2012 | |
| CN | 105924034 A | 9/2016 | |
| CN | 106495564 A | 3/2017 | |
| CN | 107117868 A | 9/2017 | |
| CN | 107206835 A | 9/2017 | |
| CN | 109133721 A | 1/2019 | |
| CN | 111655438 A | 9/2020 | |
| EP | 0 483 028 A1 | 4/1992 | |
| EP | 0 790 221 A1 | 8/1997 | |
| EP | 0 790 222 A1 | 8/1997 | |
| JP | 6-48798 A | 2/1994 | |
| JP | 7-1418 A | 1/1995 | |
| JP | 2000-218605 A | 8/2000 | |
| JP | 2000-290052 A | 10/2000 | |
| JP | 2002-104857 A | 4/2002 | |
| JP | 2002-361646 A | 12/2002 | |
| JP | 2003-40663 A | 2/2003 | |
| JP | 2005-132673 A | 5/2005 | |
| JP | 2010-258326 A | 11/2010 | |
| JP | 2013-18199 A | 1/2013 | |
| KR | 149842 B1 * | 10/1998 | |
| KR | 2001-0094571 A | 11/2001 | |
| KR | 10-2006-0083516 A | 7/2006 | |
| KR | 20-2009-0009240 U | 9/2009 | |
| KR | 10-2010-0106756 A | 10/2010 | |
| KR | 10-1049181 B1 | 7/2011 | |
| KR | 1049181 B1 * | 7/2011 | ............ B29B 11/10 |
| KR | 2001094571 A * | 11/2011 | |
| KR | 10-1270415 B1 | 6/2013 | |
| KR | 10-2013-0077142 A | 7/2013 | |
| KR | 10-2013-0077312 A | 7/2013 | |
| KR | 10-1354654 B1 | 1/2014 | |
| KR | 10-2019-0060482 A | 6/2019 | |
| KR | 10-2020-0028595 A | 3/2020 | |
| WO | WO 2007/145408 A1 | 12/2007 | |
| WO | WO 2009/044417 A1 | 4/2009 | |
| WO | WO 2020/147422 A1 | 7/2020 | |

OTHER PUBLICATIONS

Machine translation of KR-2001094571-A (Year: 2001).*
Machine translation of KR-149842-B1 (Year: 1998).*
International Search Report corresponding to International Application No. PCT/KR2021/017680, mailed Mar. 8, 2022 (7 pages, including English translation).
Extended European Search Report for European Application No. 21898691.7, dated Oct. 15, 2024.
Extended European Search Report for European Application No. 21898692.5, dated Oct. 15, 2024.
Partial Supplementary European Search Report for European Application No. 21898690.9, dated Oct. 14, 2024.
Partial Supplementary European Search Report for European Application No. 21898695.8, dated Oct. 16, 2024.
US Office Action for U.S. Appl. No. 18/250,235, dated Jul. 30, 2024.
Extended European Search Report for European Application No. 21898695.8, dated Mar. 4, 2025.
U.S. Office Action for U.S. Appl. No. 18/250,367, dated Mar. 14, 2025.
Chinese Office Action and Search Report for Chinese Application No. 202180076289.3, dated Jul. 28, 2025, with English translation of the Office Action.

* cited by examiner

[Figure 1]
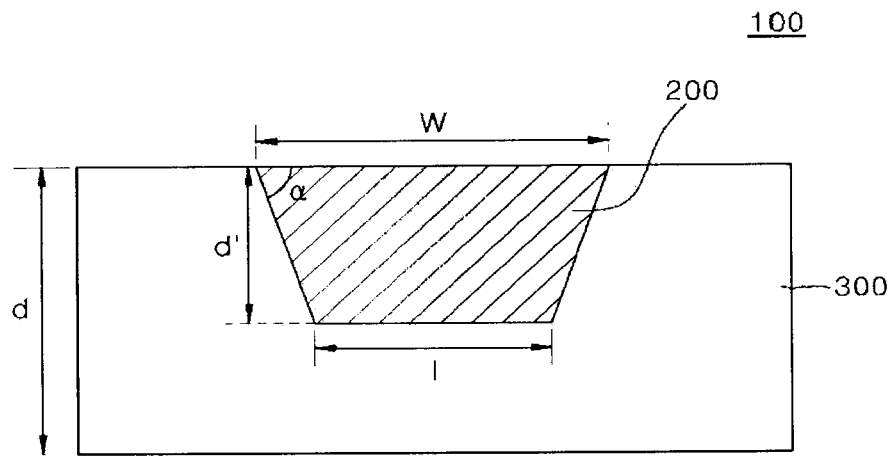
[Figure 2]
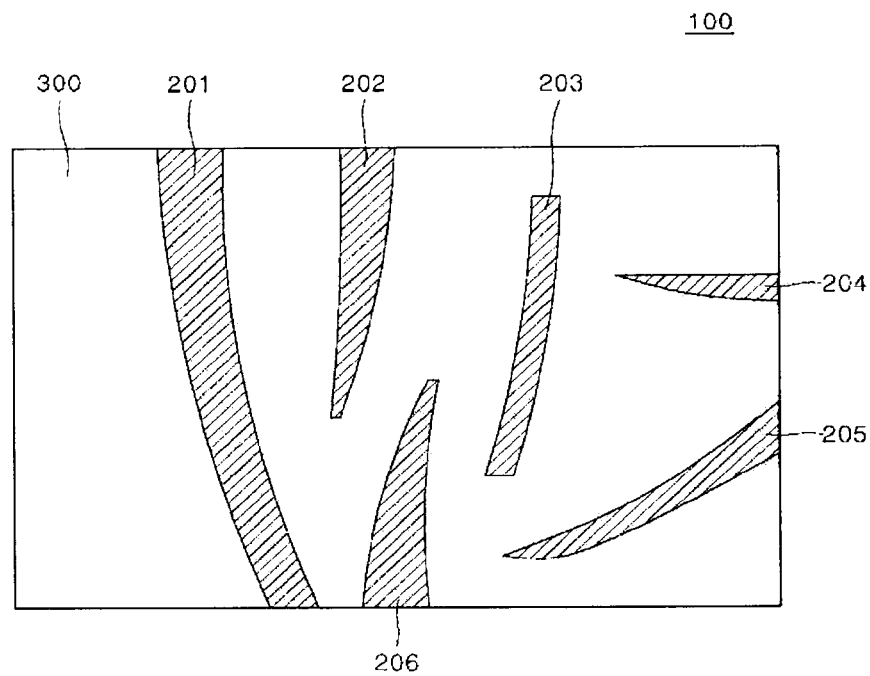

[Figure 3]
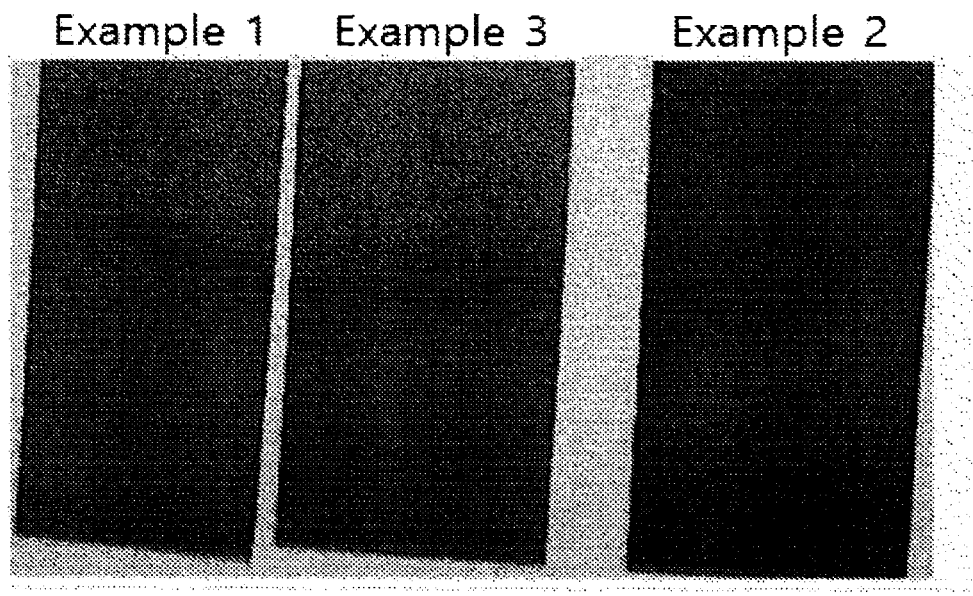
[Figure 4]
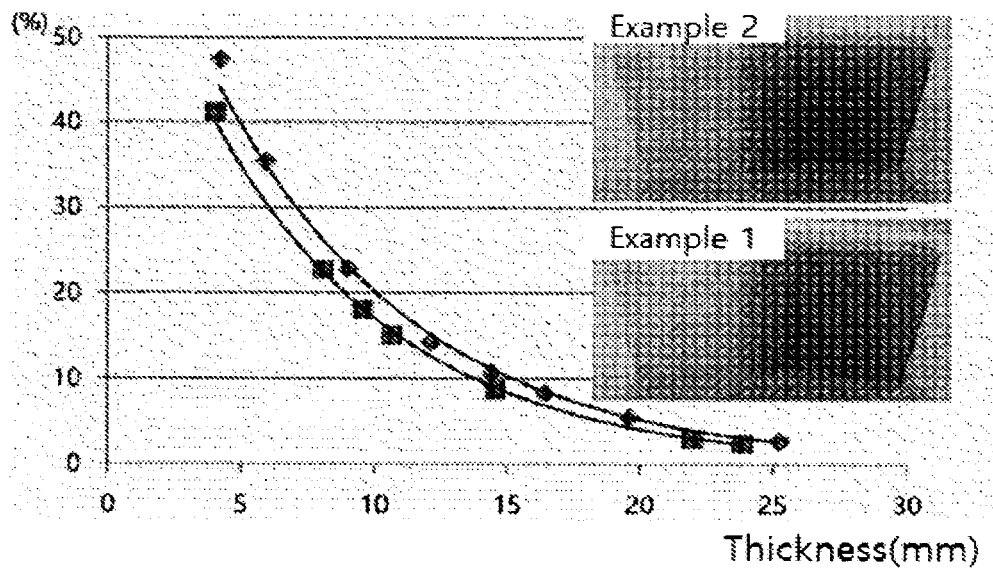

[Figure 5]
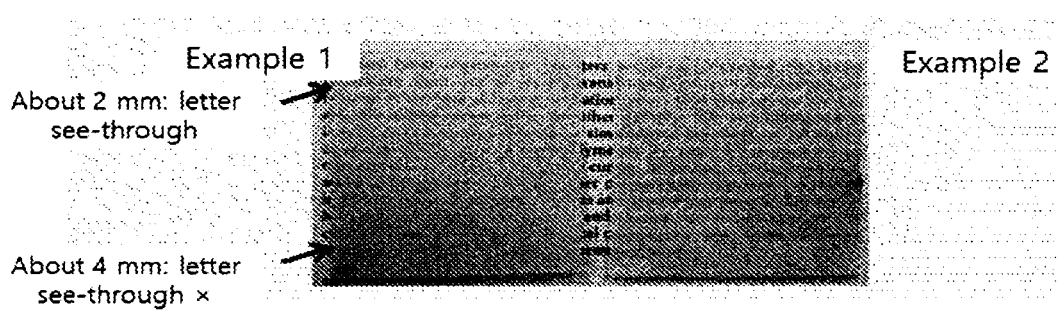
[Figure 6]
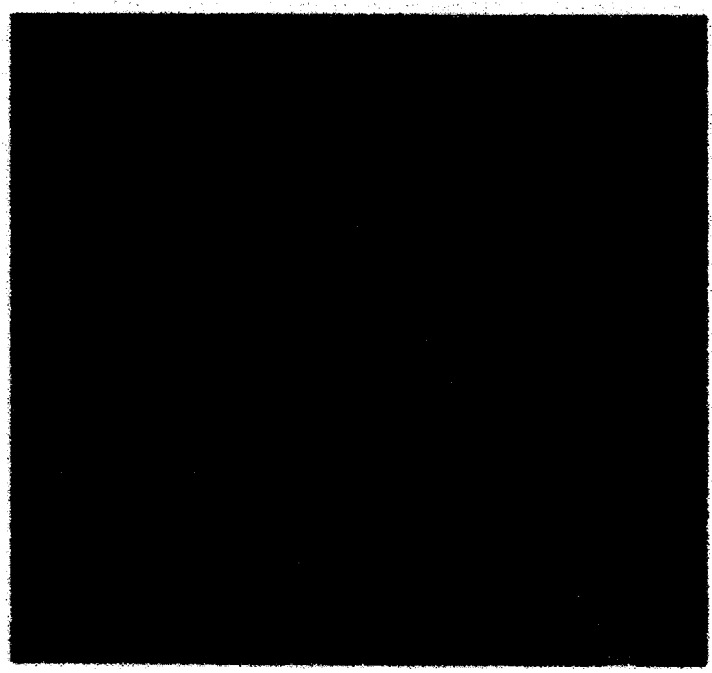

[Figure 7]
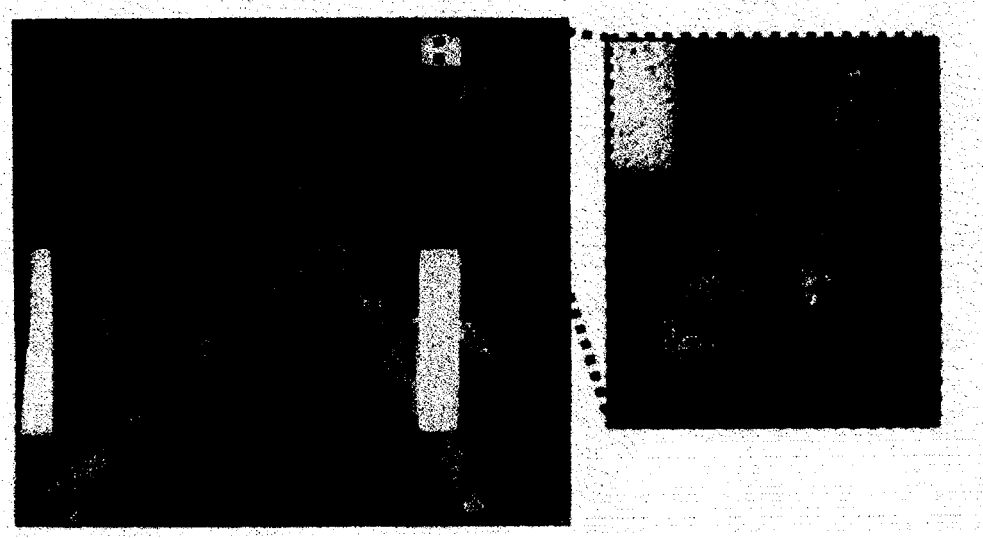
[Figure 8]
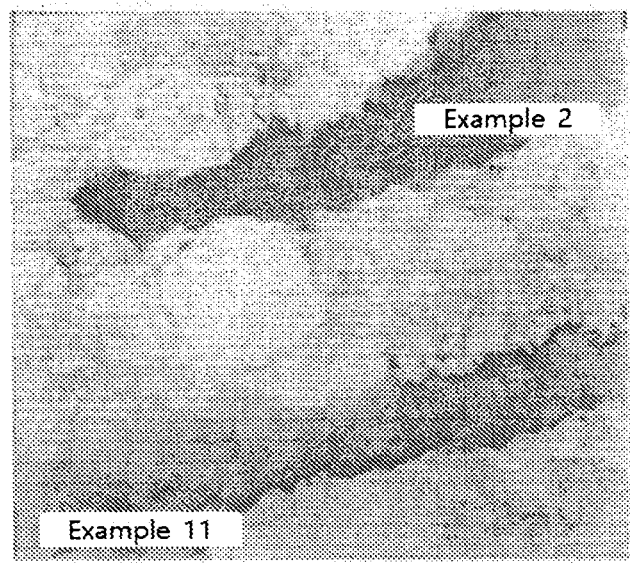

[Figure 9]

ARTIFICIAL MARBLE INCLUDING STRIPES HAVING HIGH LIGHT TRANSMITTANCE

TECHNICAL FIELD

This application claims priority to and the benefit of Korean Patent Application No. 10-2020-0183973 filed in the Korean Intellectual Property Office on Dec. 24, 2020, the entire contents of which are incorporated herein by reference.

The present invention relates to an artificial marble including a stripe having high light transmittance.

BACKGROUND ART

Engineered stone is artificial marble, also called E-stone, and is an interior design material that has a texture and feel similar to those of natural stone. In the industries, researches have been made to enhance an aesthetic sense by improving color-development, shape and the like of artificial marble. For example, Korean Patent No. 10-1270415 discloses an artificial marble with various patterns and appearances using marble chips. Demand for engineered stone is gradually increasing for interior floors, wall decorations, and kitchen worktops, and most of the products imitate natural stone species such as granite and marble.

However, in the recent interior design market, interest in quartzite with a more luxurious pattern is gradually increasing. Reflecting this trend, the E-stone industry is also making great efforts to implement the corresponding stone species.

However, it is not easy to implement a natural quartzite design with the current E-stone production technology. In the existing E-stone production process, a flow pattern is expressed by spraying a pigment on a surface of a base, or a pattern is expressed by removing a certain part of the base and then filling it with other raw materials. Although this method can express a sense of depth by using a color difference between the base and a stripe, there is a large sense of discrepancy, as compared with the actual natural stones.

DETAILED DESCRIPTION OF THE INVENTION

Technical Problem

An object of the present invention is to provide an artificial marble having a stripe in which a sense of depth is improved and the sense of depth is natural.

Technical Solution

The present invention provides an artificial marble including one or more stripe regions and a base region on a first surface of the artificial marble, in which the stripe regions extend into the artificial marble, in which the artificial marble includes a section where a surface of the section corresponding to the first surface of the artificial marble is the stripe region and an inside of the artificial marble in a vertical direction under the stripe region is the base region, and in which at least a part of the base region of the section is visible to a naked eye from the surface of the stripe region.

Advantageous Effects

In the artificial marble of the present invention, the base region under the stripe region is visible from the appearance of the artificial marble, thereby improving the sense of depth of the artificial marble and providing an aesthetic sense more similar to that of natural stone.

BRIEF DESCRIPTION OF DRAWINGS

FIG. 1 shows a cross section of an artificial marble according to an exemplary embodiment of the present invention.

FIG. 2 is a plan view of the artificial marble according to an exemplary embodiment of the present invention.

FIG. 3 is an image showing an X-ray scan result of base regions of artificial marbles of Examples 1 to 3.

FIG. 4 shows changes in transmittance according to a thickness of artificial marble samples manufactured using stripe compositions of Examples 1 and 2.

FIG. 5 shows a degree of letter see-through according to the thickness of the artificial marble samples manufactured using the stripe compositions of Examples 1 and 2.

FIG. 6 is a photograph of an artificial marble of Example 1.

FIG. 7 is a photograph of an artificial marble of Example 10.

FIG. 8 is a photograph of an artificial marble having a stripe region using the stripe composition of Example 2 and a stripe region using the stripe composition of Example 11.

FIG. 9 is a photograph of an artificial marble using the same composition as a base composition of Manufacture Example 1, except that no pigment was used.

BEST MODE

The present invention relates to an artificial marble including one or more stripe regions and a base region on a first surface of the artificial marble, in which the stripe regions extend into the artificial marble, in which the artificial marble includes a section where a surface of the section corresponding to the first surface of the artificial marble is the stripe region and an inside of the artificial marble in a vertical direction under the stripe region is the base region, and in which at least a part of the base region of the section is visible to a naked eye from the surface of the stripe region.

Hereinafter, the present invention will be described in detail.

<Stripe Region>

The artificial marble of the present invention includes a stripe region. In the present specification, the stripe region may also be referred to as a vein region, a stripe pattern region, a pattern region, a striped region, and the like.

A total transmittance of the stripe region of the artificial marble described above may be 6% or greater and 20% or less when measured using a turbidimeter (NDH 5000 available from Nippon Denshoku) for a sample of a stripe region of an artificial marble with a size of 2 cm in width, 2 cm in length, and 1.5 cm in thickness.

The stripe region of the artificial marble may have a luminance of 400 cd/m² or greater and 2000 cd/m² or less, and preferably 1000 cd/m² or greater and 2000 cd/m² or less when a sample of a stripe region of an artificial marble with a size of 2 cm in width, 2 cm in length, and 1.5 cm in thickness is illuminated with 60 lumens of light from a backlight in contact with the sample and the luminance is measured at a height of about 5 cm above a surface of the sample of the stripe region of the artificial marble by using a luminance meter (Luminance Meter LS-160 available from Konica Minolta), on a side of the sample opposite to a side in contact with the backlight. For the backlight, a point light source, for example, a mobile phone backlight may be used.

The stripe region of the artificial marble of the present invention may be more transparent than the base region. Preferably, the stripe region of the artificial marble of the present invention may have a total transmittance higher than that of the base region, and the total transmittance may be obtained by measuring a total transmittance for the sample of the stripe region or base region of the artificial marble with a size of 2 cm in width, 2 cm in length, and 1.5 cm in thickness with the turbidimeter (NDH 5000 available from Nippon Denshoku).

The stripe region of the artificial marble of the present invention may be more transparent than the base region. Preferably, the stripe region of the artificial marble of the present invention may have a luminance higher than that of the base region, and the luminance may be obtained by measuring a luminance at a height of about 5 cm above the surface of the sample of the stripe region or base region of the artificial marble with a size of 2 cm in width, 2 cm in length, and 1.5 cm in thickness with the luminance meter (Luminance Meter LS-160 available from Konica Minolta).

The stripe region may include 500 to 700 parts by weight of inorganic particles and 200 to 400 parts by weight of quartz powder on the basis of 100 parts by weight of a binder resin.

In addition, the stripe region may include 500 to 700 parts by weight of inorganic particles and 200 to 400 parts by weight of quartz powder on the basis of 100 parts by weight of the binder resin, the binder resin may include an unsaturated polyester resin in an amount of 90% by weight or more, and the quartz powder may have an average $SiO_2$ content of 99.5% by weight to 100% by weight and an alumina content of 0.5% by weight or less.

Binder Resin

The stripe region of the artificial marble of the present invention includes a binder resin. The binder resin is a binder resin including an unsaturated polyester (UPE) resin. The binder resin may include the unsaturated polyester resin in an amount of 90% by weight or more.

The binder resin may be manufactured by mixing, dispersing, and curing 0.4 to 2.5 parts by weight of a curing agent, 0.05 to 0.3 part by weight of a catalyst, and 0.5 to 7 parts by weight of a coupling agent on the basis of 100 parts by weight of the unsaturated polyester resin.

The unsaturated polyester resin may be manufactured using a resin mixture including an unsaturated polyester polymer and a vinylic monomer. Preferably, the unsaturated polyester resin is manufactured using a composition including an unsaturated polyester polymer and a vinylic monomer in a weight ratio of 100:30 to 70. More preferably, the unsaturated polyester resin is manufactured using a composition including 60% by weight to 75% by weight of the unsaturated polyester polymer and 25% by weight to 40% by weight of the vinylic monomer.

The unsaturated polyester resin may be typically a viscous solution in which the unsaturated polyester polymer is diluted in the vinylic monomer. Therefore, when the content of the vinylic monomer is included within the range described above, the viscosity can be reduced, making it easier to handle the unsaturated polyester resin. Furthermore, the vinylic monomer can cure the unsaturated polyester resin from liquid to solid through cross-linking of polyester molecular chains without generating by-products. A weight-average molecular weight of the unsaturated polyester resin is 1,000 to 10,000 g/mol.

The unsaturated polyester polymer is not particularly limited, and examples thereof may include an unsaturated polyester polymer manufactured through a condensation reaction of a saturated or unsaturated dibasic acid and a polyhydric alcohol. Examples of the saturated or unsaturated dibasic acid may include ortho-phthalic acid, isophthalic acid, maleic anhydride, citraconic acid, fumaric acid, itaconic acid, phthalic acid, phthalic anhydride, terephthalic acid, succinic acid, adipic acid, sebacic acid or tetrahydrophthalic acid. In addition, examples of the polyhydric alcohol may include ethylene glycol, diethylene glycol, triethylene glycol, propylene glycol, dipropylene glycol, tripropylene glycol, polypropylene glycol, 1,3-butylene glycol, hydrogenated bisphenol A, trimethylolpropane monoaryl ether, neopentyl glycol, 2,2,4-trimethyl-1,3-pentadiol and/or glycerin. In addition, if necessary, a monobasic acid such as acrylic acid, propionic acid or benzoic acid, or a polybasic acid such as trimellitic acid or tetracarboxylic acid of benzol may be further used.

Examples of the type of vinylic monomer may include an alkyl acrylate monomer or an aromatic vinylic monomer. However, it is preferable to use an aromatic vinylic monomer in consideration of reactivity with the unsaturated polyester polymer. For example, as the aromatic vinylic monomer, one or more selected from the group consisting of styrene, α-methylstyrene, p-methylstyrene, vinyl toluene, alkyl styrene substituted with an alkyl group having 1 to 3 carbon atoms, and styrene substituted with a halogen may be used, and preferably, a styrene monomer may be used.

The curing agent may be included for a curing reaction of the binder, and is not particularly limited as long as a curing agent that is used when manufacturing engineered stone is used. The curing agent may be an organic peroxide-based compound or an azo-based compound. The organic peroxide-based compound may be one or two or more selected from a tert-butyl peroxybenzoate thermal curing agent (TBPB, Trigonox C, akzo nobel), diacyl peroxide, hydroperoxide, ketone peroxide, peroxy ester, peroxy ketal, dialkyl peroxide, alkyl perester, percarbonate, and peroxydicarbonate. For example, the compound may be tert-butyl peroxybenzoate thermal curing agent, benzoyl peroxide, dicumyl peroxide, butyl hydroperoxide, cumyl hydroperoxide, methyl ethyl ketone peroxide, t-butyl peroxy maleic acid, t-butyl hydroperoxide, acetyl peroxide, lauroyl peroxide, t-butyl peroxy neodecanoate, or t-amyl peroxy 2-ethyl hexanoate, but is not necessarily limited thereto.

In addition, the azo-based compound may be azobisisobutyronitrile, but is not necessarily limited thereto. The binder resin may include 0.4 to 2.5 parts by weight of the curing agent on the basis of 100 parts by weight of the unsaturated polyester resin. If the curing agent is included in an amount below the above range, it is difficult to cure the binder, and if the curing agent is included in an amount exceeding the above range, discoloration of the binder may occur, and therefore, the curing agent may be included within the above range.

The catalyst may be included to promote curing of the binder at a low temperature, is not particularly limited as long as a catalyst that is used in the manufacture of engineered stone is used, and may be one or two or more selected from cobalt-based, vanadium-based, or manganese-based metal soaps, tertiary amines, quaternary ammonium salts, and mercaptans. For example, a cobalt 6% catalyst (Hex-Cem, Borchers) may be used. The binder resin may include 0.05 to 0.3 part by weight of the catalyst on the basis of 100 parts by weight of the unsaturated polyester resin. If the catalyst is included in an amount below the above range, curing is not promoted, and if the catalyst is included in an amount exceeding the above range, discoloration of the binder may occur, and therefore, the catalyst may be included within the above range.

The coupling agent may be included to improve bonding force between the binder and natural mineral particles, and may be a silane-based or silicate-based coupling agent. The binder resin may include 0.5 to 7 parts by weight of the coupling agent on the basis of 100 parts by weight of the unsaturated polyester resin. If the coupling agent is included in an amount below the above range, the bonding force with the natural mineral particles is reduced, and if the coupling agent is included in an amount exceeding the above range, the cost of the raw material increases, and therefore, the coupling agent may be included within the above range.

Inorganic Particles

In the present invention, the inorganic particles of the stripe region refer to inorganic particles having a particle size of 0.1 to 4 mm. The particle size may be measured using a particle size analyzer (Beckman Coulter LS 13 320 particle size analyzer).

The inorganic particles of the stripe region of the present invention may be amorphous silica particles, glass particles, crystalline quartz particles, or the like. In addition, the inorganic particles of the stripe region may be one or more selected from the group consisting of amorphous silica particles, glass particles containing a barium element, and crystalline quartz particles. The inorganic particles may be amorphous silica particles or crystalline quartz particles, and the inorganic particles may be inorganic particles having an average $SiO_2$ content of 99.5% by weight or more and 100% by weight or less. The inorganic particles may be glass particles having a barium (Ba) element content of 10% by weight or more and 35% by weight or less.

Preferably, the inorganic particles of the stripe region of the present invention are amorphous silica particles, glass particles containing a barium element, and/or crystalline quartz particles having an average $SiO_2$ content of 99.5% by weight or more and 100% by weight or less. More preferably, the inorganic particles of the stripe region are amorphous silica particles, glass particles having a barium (Ba) element content of 10% by weight or more and 35% by weight or less in the particles, and/or crystalline quartz particles having an average $SiO_2$ content of 99.5% by weight or more and 100% by weight or less. More preferably, the inorganic particles of the stripe region are amorphous silica particles and glass particles having a barium (Ba) element content of 10% by weight or more and 35% by weight or less in the particles. An artificial marble manufactured using, as the inorganic particles of the stripe region, amorphous silica particles or glass particles having a barium (Ba) element content of 10% by weight or more and 35% by weight or less in the particles has transparency of the stripe region higher than that of an artificial marble manufactured using, as the inorganic particles, crystalline quartz particles having an average $SiO_2$ content of 99.5% by weight or more and 100% by weight or less. In addition, an artificial marble manufactured using, as the inorganic particles of the stripe region, amorphous silica particles or glass particles having a barium (Ba) element content of 10% by weight or more and 35% by weight or less in the particles has luminance of the stripe region higher than that of an artificial marble manufactured using, as the inorganic particles, crystalline quartz particles having an average $SiO_2$ content of 99.5% by weight or more and 100% by weight or less.

The inorganic particles of the stripe region may be amorphous silica particles. Silica particles are a term commonly used in the field of artificial marble, and generally refer to $SiO_2$-based inorganic particles having a high $SiO_2$ content of 90% by weight or more, and including small amounts of other components such as minerals, in addition to $SiO_2$. The amorphous silica particles of the stripe region of the present invention may be amorphous fused silica particles, and the amorphous silica particles of the stripe region may also be referred to as highly transparent amorphous fused silica particles in the present specification. The amorphous fused silica particles may be amorphous fused silica particles having a particle size of 0.1 to 4 mm, and may have an average $SiO_2$ content of 99.5 to 100% by weight, preferably 99.6 to 100% by weight, and more preferably 99.7 to 100% by weight, and an alumina content of 0.5% by weight or less, preferably 0.4% by weight or less, more preferably 0.3% by weight or less, and even more preferably 0.2% by weight or less. When the average $SiO_2$ content in amorphous silica particles is 99.5% by weight or more, preferably 99.6% by weight or more, and more preferably 99.7% by weight or more, the transparency of the stripe region of the artificial marble is further improved.

The $SiO_2$ content of silica particles and quartz particles of the present invention can be confirmed by quantitatively analyzing the content with XRF (X-Ray Fluorescence spectrometer). In addition, crystalline particles and amorphous particles can be confirmed by XRD (X-ray diffraction), and are generally confirmed by making the particles into pellets and measuring the same.

The inorganic particles of the stripe region may be glass particles containing a barium element. Preferably, the glass particles of the stripe region have a barium (Ba) element content in the particle of 10% by weight or more and 35% by weight or less, and preferably 15% by weight or more and 25% by weight or less. In the present specification, the expression described as "content in particles" is based on 100% by weight of particles. In addition, the content of the barium element included in the inorganic particles may be 5% by weight or more and 25% by weight or less, and preferably 10% by weight or more and 15% by weight or less on the basis of 100 parts by weight of the stripe region.

Since glass is amorphous, the glass particles containing the barium element of the stripe region may also be referred to as highly transparent amorphous glass particles in the present specification. In this case, high transparency means that the transparency is 90% or greater and 100% or less, and means having a transmittance of 90% or greater in the visible ray region as measured by a UV/VIS spectrophotometer on a glass plate-shaped basis before being pulverized into particles.

The presence of the barium element in the glass particles used in the stripe region can be detected by X-ray scan, and the content of the barium element can be measured by X-ray fluorescence spectroscopy (XRF). The content of barium (Ba) element in the glass particles is preferably 10% by weight or more and 35% by weight or less, and more preferably 15% by weight or more and 25% by weight or less. Even when the barium element content deviates from the above range, the transparency of the glass particles themselves is good, but if an artificial marble is manufactured using the glass particles, the stripe region of the artificial marble may appear bluish or greenish (jade green) to the naked eye, making it unsuitable for use depending on the end use. That is, when the stripe region is made using glass particles having a barium (Ba) element content of 10% by weight or more and 35% by weight or less, an artificial marble with good product quality and good color without bluish or greenish color can be manufactured.

The content of the barium element in the stripe region can be confirmed as follows. When a stripe composition is manufactured using glass particles containing a barium element and an artificial marble is manufactured using the stripe composition, the barium element is included in the stripe region of the artificial marble. When the artificial marble containing a certain amount or more of barium element in this way is scanned using X-ray, the stripe region of the artificial marble appears bluish in the X-ray photographed image. The barium element content in the glass particles can be measured by XRF.

Preferably, the glass particles of the stripe region may be glass particles having a particle size of 0.1 to 4 mm, and may be highly transparent glass particles having a transmittance of 90% or greater in the visible ray region as measured by a UV/VIS spectrophotometer on a glass plate-shaped basis before being pulverized into particles.

The inorganic particles of the stripe region of the present invention may be crystalline quartz particles. The crystalline quartz particles of the stripe region of the present invention may also be referred to as highly transparent crystalline quartz particles in the present specification.

In this case, the crystalline quartz particles of the stripe region may be highly transparent crystalline quartz particles having a particle size of 0.1 to 4 mm, and may have an average $SiO_2$ content of 99.5 to 100% by weight, preferably 99.6 to 100% by weight, and more preferably 99.7 to 100% by weight, and an alumina content of 0.5% by weight or less, preferably 0.4% by weight or less, more preferably 0.3% by weight or less, and even more preferably 0.2% by weight or less.

When the average $SiO_2$ content in the crystalline quartz particles of the stripe region is less than 99.5% by weight, for example, 99.4% by weight or less, the transparency of the stripe region of the artificial marble is lowered. Therefore, the quartz particles of the stripe region are preferably crystalline quartz particles having an average $SiO_2$ content of 99.5% by weight or more.

Quartz Powder

Quartz powder refers to quartz powder having a particle size of 0.1 mm or less. The particle size may be measured using a particle size analyzer (Beckman Coulter LS 13 320 particle size analyzer).

The quartz powder of the stripe region of the present invention may also be referred to as a highly transparent crystalline quartz powder in the present specification.

The quartz powder of the stripe region of the present invention is crystalline quartz powder, and is preferably crystalline quartz powder having a $SiO_2$ content of 99.5% by weight or more and 100% by weight or less. The quartz powder of the stripe region may be quartz powder having a $SiO_2$ content of 99.5% by weight or more and 100% by weight or less, preferably 99.6% by weight or more and 100% by weight or less, and more preferably 99.7% by weight or more and 100% by weight or less, and an alumina content of 0.5% by weight or less, preferably 0.4% by weight or less, more preferably 0.3% by weight or less, and even more preferably 0.2% by weight or less.

The quartz powder of the stripe region may have an average $SiO_2$ content of 99.5% by weight or more and 100% by weight or less, preferably 99.6% by weight or more and 100% by weight or less, and more preferably 99.7% by weight or more and 100% by weight or less, and an average alumina content of 0.5% by weight or less, preferably 0.4% by weight or less, more preferably 0.3% by weight or less, and even more preferably 0.2% by weight or less.

The $SiO_2$ content of quartz powder of the stripe region can be confirmed by quantitatively analyzing the content with XRF (X-Ray Fluorescence spectrometer). In this case, the powders are generally made into pellets, which are then measured and confirmed with respect to the content.

Since the quartz powder of the stripe region has a small particle size, self-scattering occurs. Therefore, in order to increase the internal transmittance of the stripe region of the artificial marble, the stripe composition of the present invention includes crystalline quartz powder having an average $SiO_2$ content of 99.5% by weight or more. If the average $SiO_2$ content of quartz powder is less than 99.5% by weight, the internal transmittance of the stripe region of the artificial marble is low, making it difficult to manufacture the artificial marble of the present invention in which the base region under the stripe region is visible, a sense of depth of the artificial marble is provided and transparency of the stripe region is high.

The stripe composition of the present invention may or may not include a pigment. The pigment is preferably an inorganic pigment. The pigment is not particularly limited as long as it is a pigment that is generally used in the manufacture of artificial marble is used, and may be, for example, $TiO_2$, $NiO \cdot Sb_2O_3 \cdot 20TiO_2$, $Fe_2O_3$, $Fe_3O_4$, etc. In this case, the pigment is included in an amount of 0.01% by weight or more and 1% by weight or less, preferably 0.01% by weight or more and 0.5% by weight or less, and more preferably 0.01% by weight or more and 0.3% by weight or less on the basis of 100% by weight of the stripe composition.

When the stripe composition of the present invention includes a pigment, it is preferred to gently mix the pigment so that the pigment is not homogeneously distributed in the stripe composition. As the pigment is non-uniformly present in this way, the stripe region may remain transparent, and the stripe region has a more transparent appearance due to the pigment.

<Base Region>

The artificial marble of the present invention includes a base region.

The base region may include a binder resin, inorganic particles, and quartz powder. Also, the base region may include a binder resin, inorganic particles, quartz powder, and a pigment.

The inorganic particles refer to inorganic particles having a particle size of 0.1 to 4 mm. The particle size may be measured using a particle size analyzer (Beckman Coulter LS 13 320 particle size analyzer). The $SiO_2$ content of crystalline quartz particles can be confirmed by quantitatively analyzing the content with XRF (X-Ray Fluorescence spectrometer).

In an exemplary embodiment of the present invention, the base region may be a region in which the base composition of the present invention including a binder resin, inorganic particles, and quartz powder is cured. In another exemplary embodiment of the present invention, the base region may be a region in which the base composition of the present invention including a binder resin, inorganic particles, quartz powder, and a pigment is cured. The base region may include 500 to 700 parts by weight of inorganic particles and 200 to 400 parts by weight of quartz powder on the basis of 100 parts by weight of the binder resin. In addition, 0.01 to 2% by weight of the pigment may be included based on 100% by weight of the base composition. The binder resin may include the unsaturated polyester resin in an amount of 90% by weight or more. The binder resin may be the same as or different from the binder resin used in the stripe region.

In an exemplary embodiment of the present invention, the quartz powder of the base region may have an average $SiO_2$ content of 80% by weight or more and 99.4% by weight or less. The inorganic particles of the base region of the present invention may be crystalline quartz particles having an average $SiO_2$ content of 80% by weight or more and 99.4% by weight or less, glass particles containing a barium (Ba) element, or silica particles. For example, the inorganic particles of the base region of the present invention may be one or more selected from the group consisting of amorphous silica particles, glass particles containing a barium element, and crystalline quartz particles. For example, the silica particles or crystalline quartz particles may have an average $SiO_2$ content of 80% by weight or more and 99.4% by weight or less. In addition, the inorganic particles may be glass particles having a barium (Ba) element content in the particles of 10% by weight or more and 35% by weight or less, and preferably 15% by weight or more and 25% by weight. In the present specification, the expression described as "content in particles" is based on 100% by weight of particles. In addition, the content of the barium element included in the inorganic particles may be 5% by weight or more and 25% by weight or less, and preferably 10% by weight or more and 15% by weight or less on the basis of 100 parts by weight of the base region.

The inorganic particles used in the base region of the present invention may include inorganic particles that are used in the stripe region. That is, the inorganic particles used in the stripe region of the present invention may also be used as the inorganic particles of the base region of the present invention. In the present invention, a pigment is used when manufacturing a base composition, thereby manufacturing an opaque base composition and an opaque base region. Therefore, the inorganic particles used in the base region of the present invention may be inorganic particles with high transparency due to a high $SiO_2$ content, inorganic particles with low transparency due to a low $SiO_2$ content, glass particles containing a barium element, or amorphous or crystalline inorganic particles. For example, the inorganic particles used in the base region of the present invention may be selected from crystalline quartz particles, glass particles containing a barium (Ba) element, and amorphous silica particles. In this case, the presence of the barium element in the glass particles of the base region can be detected by X-ray scan, and the content of the barium element can be measured by X-ray fluorescence spectroscopy (XRF).

The base region of the artificial marble of the present invention may be more opaque than the stripe region. Preferably, the base region of the artificial marble of the present invention may have a total transmittance lower than that of the stripe region, and the total transmittance may be obtained by measuring a total transmittance for a sample of the stripe region or base region of the artificial marble with a size of 2 cm in width, 2 cm in length, and 1.5 cm in thickness with the turbidimeter (NDH 5000 available from Nippon Denshoku).

A total transmittance of the base region of the artificial marble of the present invention may be1 % or greater and less than 6% when measured using the turbidimeter (NDH 5000 available from Nippon Denshoku) for a sample of a base region of an artificial marble with a size of 2 cm in width, 2 cm in length, and 1.5 cm in thickness.

The base region of the artificial marble of the present invention may be more opaque than the stripe region. Preferably, the base region of the artificial marble of the present invention may have luminance lower than that of the stripe region, and the luminance may be obtained by measuring a luminance at a height of about 5 cm above the surface of the sample of the stripe region or base region of the artificial marble with a size of 2 cm in width, 2 cm in length, and 1.5 cm in thickness with the luminance meter (Luminance Meter LS-160 available from Konica Minolta).

The base region of the artificial marble of the present invention may have a luminance of 1 $cd/m^2$ or greater and less than 1000 $cd/m^2$ when a sample of a base region of an artificial marble with a size of 2 cm in width, 2 cm in length, and 1.5 cm in thickness is illuminated with 60 lumens of light from a backlight in contact with the sample and the luminance is measured at a height of about 5 cm above the surface of the sample of the base region of the artificial marble by using the luminance meter (Luminance Meter LS-160 available from Konica Minolta), on a side of the sample opposite to a side in contact with the backlight.

The pigment of the present invention is preferably an inorganic pigment. The pigment of the present invention is not particularly limited as long as a pigment that is generally used in the manufacture of artificial marble is used. The pigment of the present invention may be $TiO_2$, $NiO \cdot Sb_2O_3 \cdot 20TiO_2$, $Fe_2O_3$, $Fe_3O_4$, etc. In this case, the pigment may be included in an amount of 0.01% by weight or more and 0.7% by weight or less, and preferably 0.01% by weight or more and 0.6% by weight or less on the basis of 100% by weight of the base composition.

<Artificial Marble>

The artificial marble of the present invention includes a stripe region and a base region. The artificial marble of the present invention may include a section where a surface of the section corresponding to the first surface of the artificial marble is the stripe region and the base region is located in an inside of the artificial marble in a vertical direction under the stripe region. That is, the artificial marble of the present invention may include a section covered with the stripe region and having the base region inside the artificial marble. In this case, in the above section, a thickness of the stripe region from the stripe region on the surface of the artificial marble to the base region inside the artificial marble may be 0.5 mm or less, or 1 mm or less, or 2 mm or less, and may be less than a thickness of artificial marble by 2 mm or greater, or may be equal to or less than the thickness of artificial marble by 2 mm or greater. In this case, the base region of the section (i.e., the base region located inside the artificial marble) is visible to the naked eye from an outside of the artificial marble, i.e., the surface of the stripe region on the first surface.

When the surface of the artificial marble is observed from the outside, i.e., from above the artificial marble, there is a difference in transparency between the base region and the stripe region. In this case, the relatively transparent region may be the stripe region and the relatively opaque region may be the base region.

The artificial marble of the present invention includes one or more stripe regions and a base region on the first surface of the artificial marble. In this case, the first surface may be a surface having the largest area of the artificial marble. The stripe region may extend into the artificial marble. The artificial marble of the present invention includes a section where a surface of the section corresponding to the first surface of the artificial marble is the stripe region and an inside of the artificial marble in a vertical direction under the stripe region is the base region, and at least a part of the base region of the section is visible to a naked eye from the surface of the stripe region.

In addition, the artificial marble of the present invention has one or more interfaces between the stripe region and the base region, i.e., boundaries where the stripe region and the base region abut each other on the first surface of the artificial marble, the interfaces extend into the artificial marble, and at least one of the extending interfaces may be or may not be parallel to a thickness direction of the artificial marble. In this case, the thickness direction of the artificial marble may be a direction perpendicular to the first surface.

In addition, the artificial marble of the present invention has one or more interfaces between the stripe region and the base region, i.e., boundaries where the stripe region and the base region abut each other on the first surface of the artificial marble, the interfaces extend into the artificial marble, and an angle (cx in FIG. 5) between at least one of the extending interfaces and the first surface may be greater than 0° and smaller than 90°, or may be 90°.

In an exemplary embodiment of the present invention, the artificial marble of the present invention may be an artificial marble including one or more stripe regions and a base region on a first surface of the artificial marble, in which the stripe regions extend into the artificial marble, and in which the artificial marble includes at least one stripe region extending from the first surface to a second surface opposite to the first surface, a normal line drawn from the stripe region on the first surface passing through only the at least one stripe region without meeting the base region. In an exemplary embodiment of the present invention, the artificial marble of the present invention may include one or more stripe regions extending from the first surface to the second surface to penetrate through the artificial marble, in which when a normal line is drawn downward in a vertical direction from one point of a stripe composition on the first surface, the normal line does not meet the base region.

In an exemplary embodiment of the present invention, the stripe region and/or the base region may include a pigment, and the pigment of the stripe region and the pigment of the base region may be different. In an exemplary embodiment of the present invention, the base region may include a pigment and the stripe region may not include a pigment. In addition, in an exemplary embodiment of the present invention, the stripe region and the base region may include a pigment, and a density of the pigment of the stripe region may be different from that of the base region.

In addition, the first surface of the artificial marble of the present invention may include one or more selected from the group consisting of a stripe region extending from one edge to another edge of the first surface, a stripe region that does not extend from one edge to another edge of the first surface, and a stripe region not located at an edge of the first surface. In this case, another edge may be an adjacent edge, an opposite edge, or both. In this case, the stripe region extends into the artificial marble, there may be a section where the base region is present in a vertical direction under the stripe region extending into the artificial marble, and at least a part of the base region under the stripe region is visible to the naked eye from the first surface of the artificial marble.

In the present specification, the total transmittance and luminance of the stripe region of the artificial marble of the present invention are measured with the stripe region being separated so that the base region is not included. The total transmittance and luminance of the base region of the artificial marble of the present invention are also measured with the base region being separated so that the stripe region is not included.

In the artificial marble of the present invention, when the stripe region is separated and the thickness of the stripe region is 5 mm, the total transmittance of the stripe region may be 35% or greater and 60% or less when measured using the turbidimeter (NDH 5000 available from Nippon Denshoku). In addition, in the artificial marble of the present invention, when the stripe region is separated and the thickness of the stripe region is 10 mm, the total transmittance of the stripe region may be 10% or greater and 40% or less when measured using the turbidimeter (NDH 5000 available from Nippon Denshoku).

The stripe region of the present invention may be a region having a total transmittance of 6% or greater and 20% or less when the stripe region is separated and the total transmittance is measured using the turbidimeter (NDH 5000 available from Nippon Denshoku) for a sample of a stripe region of an artificial marble with a size of 2 cm in width, 2 cm in length, and 1.5 cm in thickness. In this case, the total transmittance is a sum of a diffusion transmittance and a parallel transmittance.

In addition, the stripe region of the present invention may be a region having a luminance of 400 $cd/m^2$ or greater and 2000 $cd/m^2$ or less, and preferably 1000 $cd/m^2$ or greater and 2000 $cd/m^2$ or less when the stripe region is separated, a sample of a stripe region of an artificial marble with a size of 2 cm in width, 2 cm in length, and 1.5 cm in thickness is illuminated with 60 lumens of light from a backlight in contact with the sample and the luminance is measured at a height of about 5 cm above the surface of the sample of the stripe region of the artificial marble by using a luminance meter (Luminance Meter LS-160 available from Konica Minolta), on a side of the sample opposite to a side in contact with the backlight.

The base region of the present invention may be a region having a total transmittance of 1% or greater and less than 6% when measuring the total transmittance by using the turbidimeter (NDH 5000 available from Nippon Denshoku) for a sample of a base region of an artificial marble with a size of 2 cm in width, 2 cm in length, and 1.5 cm in thickness. In this case, the total transmittance is a sum of a diffusion transmittance and a parallel transmittance.

In addition, the base region of the present invention may be a region having a luminance of 1 $cd/m^2$ or more and less than 1000 $cd/m^2$ when a sample of a base region of an artificial marble with a size of 2 cm in width, 2 cm in length, and 1.5 cm in thickness is illuminated with 60 lumens of light from a backlight in contact with the sample and the luminance is measured at a height of about 5 cm above the surface of the sample of the base region of the artificial marble by using the luminance meter (Luminance Meter LS-160 available from Konica Minolta), on a side of the sample opposite to a side in contact with the backlight.

The total transmittance of the stripe region of the artificial marble of the present invention may be greater than that of the base region. In this case, the total transmittance is a sum of a diffusion transmittance and a parallel transmittance, and can be measured using the turbidimeter (NDH 5000 available from Nippon Denshoku).

The luminance of the stripe region of the artificial marble of the present invention may be greater than that of the base region. In this case, the luminance can be measured by illuminating a sample of a base region or stripe region with 60 lumens of light from a backlight in contact with the sample and using the luminance meter (Luminance Meter LS-160 available from Konica Minolta) at a height of about 5 cm above the surface of the base region or stripe region on a side of the sample opposite to a side in contact with the backlight.

Based on a surface of the widest surface (e.g., first surface) of the artificial marble, the stripe region may occupy 5 to 50% of a surface area of the artificial marble.

Based on the surface of the widest surface (e.g., first surface) of the artificial marble, the base region may occupy 95 to 50% of the surface area of the artificial marble. In this case, the surface of the artificial marble may include another pattern region other than the stripe region, for example, another region using chips, etc. In this case, a sum of the base region and the stripe region on the surface of the artificial marble may be less than 100%.

The artificial marble of the present invention has high transparency in the stripe region (i.e., light transmittance measured by the total transmittance is high), so that not only the stripe region exposed to the surface but also the base region covered with the stripe region can be observed with the naked eye from the outside of the artificial marble.

The artificial marble of the present invention includes a section where a surface of the section corresponding to the first surface of the artificial marble is the stripe region and the base region is present in an inside of the artificial marble in a vertical direction under the stripe region. In this case, at least a part of the base region of the section is visible to the naked eye from the surface of the stripe region. FIG. 1 is a cross section of an artificial marble according to an exemplary embodiment of the present invention, in which a part of a section where a surface of the artificial marble is a stripe region 200 and a base region 300 is present under the stripe region can be seen with the naked eye. The artificial marble of FIG. 1 includes the base region on a second surface opposite to the first surface of the artificial marble. In this case, the artificial marble shows a section where a surface of the section corresponding to the second surface of the artificial marble is the base region and an inside of the artificial marble in a vertical direction over the base region is the stripe region. However, in another exemplary embodiment of the present invention, the surface of the second surface of the artificial marble may also have a base region and a stripe region (not shown). The artificial marble of the present invention may have one or more interfaces between the stripe region and the base region on the first surface of the artificial marble, the interfaces may extend into the artificial marble, and an angle (cx in FIG. 5) between at least one of the extending interfaces and the first surface may be greater than 0° and smaller than 90°, or may be 90°. In this case, as a depth from the stripe region to the base region of the surface of the artificial marble deepens, a color of the base region under the stripe region may look dim. The stripe region may have the same thickness as that of the artificial marble, and the stripe region may extend from the first surface to the second surface and penetrate through the artificial marble. That is, the artificial marble of the present invention may include one or more stripe regions extending from the first surface to the second surface and penetrating through the artificial marble.

A width (w) of the stripe region appearing on the surface of the artificial marble may be 0.3 to 20 cm, preferably 0.4 to 15 cm, and more preferably 0.5 to 10 cm.

A thickness (d') of the stripe region of the present invention may be 0.5 to 100% of a thickness (d) of the artificial marble. The stripe region may extend obliquely or vertically from the surface of the artificial marble into the artificial marble. The thickness of the stripe region is the thickness (d') obtained by measuring a length ranging from the surface of the artificial marble to an end of the stripe region extending into the artificial marble, in a direction perpendicular to the surface of the artificial marble. In an exemplary embodiment of the present invention, the thickness of the artificial marble of the present invention may be 6 mm or greater and 30 mm or less, and the thickness of the stripe region may be 0.03 mm or greater and 30 mm or less. One skilled in the art may appropriately adjust the width and thickness of the stripe region to manufacture an artificial marble having a desired aesthetic sense and sense of depth.

The stripe region of the present invention may be formed vertically (90°) or obliquely with respect to the surface of the artificial marble. That is, the stripe region of the present invention may be formed from the surface of the artificial marble to the inside at an angle rather than parallel to the thickness direction of the artificial marble, i.e., the vertical direction from the surface of the artificial marble. Even when the stripe region is located on the surface of the artificial marble, there may be a section where a base region is present in an inside of the artificial marble in a vertical direction under the stripe region. In addition, even when the base region is located on the surface of the artificial marble, there may be a section where a stripe region is located in an inside of the artificial marble in a vertical direction under the base region.

FIG. 2 shows an example of the artificial marble of the present invention. When the artificial marble is seen from above, stripe regions 201, 202, 203, 204, 205, and 206 are present on a surface of the artificial marble, and a base region 300 is also present. The stripe region may extend from one edge to another edge of the artificial marble. For example, the stripe region may extend from one edge to an opposite edge of the artificial marble (201). In addition, the stripe region may extend from one edge to an adjacent edge, i.e., a next edge of the artificial marble (not shown). Further, the stripe region may not extend from one edge to another edge (202, 204 and 205). Further, the stripe region may not be located at the edge (203).

<Manufacturing Method of Artificial Marble>

The artificial marble of the present invention may be manufactured by putting a base composition into a mold, forming a groove on the base composition, putting a stripe composition into the groove to form a stripe pattern, and then curing an artificial marble composition having the stripe pattern formed thereon. In this case, the specific manufacturing method may use a general technology that is used in the field of artificial marble, and is not particularly limited.

In an exemplary embodiment, the artificial marble of the present invention can be formed with a stripe pattern by using a mixing and robot patterning method. For example, in an exemplary embodiment, the manufacturing method of an artificial marble of the present invention may include steps of putting a base composition into a rubber mold and scraping a top of the base composition to form a groove by using a tool having a sharp tip such as an awl, a knife, a chisel, a blade and an engraving tool, and a tool and/or a robot having a wide protrusion capable of pressing the base composition to form a groove; putting a stripe composition into the groove and then performing compression molding with vacuum press equipment; curing the molded composition at 90° C. to 130° C. for 30 minutes to 1 hour; after the curing is completed, cooling the composition to room temperature (cooling), and then removing the same from the mold (mold release) to manufacture an artificial marble; and cutting the artificial marble on all sides and then performing post-processing of smoothing surfaces.

The advantages and features of the present invention, and a method for achieving the same will become apparent with reference to the examples described below in detail. However, the present invention is not limited to the examples disclosed below, but can be implemented in a variety of different forms. The examples are provided to only complete the disclosure of the present invention and to allow one skilled in the art to completely understand the category of the present invention. The present disclosure is defined by the category of the claims.

<Materials and Methods>

For the highly transparent crystalline quartz particles, highly transparent crystalline quartz particles having a particle size of 0.1 to 2.5 mm were used. In addition, the highly transparent crystalline quartz particles are quartz having a $SiO_2$ content of 99.7% by weight or more and 100% by weight or less and a crystallinity of 100%.

For the highly transparent amorphous fused silica particles, highly transparent amorphous fused silica particles having a particle size of 0.1 to 2.5 mm were used. In addition, the highly transparent amorphous fused silica particles have a $SiO_2$ content of 99.7% by weight or more and 100% by weight or less, and an average $SiO_2$ content of 99.7% by weight.

For the highly transparent amorphous glass particles, highly transparent amorphous glass particles having a particle size of 0.1 to 2.5 mm in diameter were used. In addition, the highly transparent amorphous glass particles are glass particles having a transmittance of 90% or greater in the visible ray region as measured by a UV/VIS spectrophotometer on a glass plate-like basis before being pulverized into particles. In this test, highly transparent amorphous glass particles having a barium element content of 17% by weight and highly transparent amorphous glass particles containing no barium element were used.

For the highly transparent crystalline quartz powder, highly transparent crystalline quartz powder having a particle size of 0.1 mm or smaller in diameter was used. In addition, the highly transparent crystalline quartz powder has an alumina content of 0.5% by weight or less. In this experiment, several types of quartz powders were used according to the $SiO_2$ content.

That is, highly transparent crystalline quartz powder having a $SiO_2$ content of 99.7% by weight or more and 100% by weight or less and an average $SiO_2$ content of 99.7% by weight, highly transparent crystalline quartz powder having a $SiO_2$ content of 99.5% by weight or more and less than 99.7% by weight and an average $SiO_2$ content of 99.5% by weight, and transparent crystalline quartz powder having a $SiO_2$ content of 99.4% by weight or more and less than 99.5% by weight and an average $SiO_2$ content of 99.4% by weight were used.

The opaque crystalline quartz particles used in Comparative Examples and Manufacture Examples were particles generally used in the field of artificial marble, preferably E-stone, and opaque crystalline quartz particles having a particle size of 0.1 to 2.5 mm were used. In addition, the opaque crystalline quartz particles have a $SiO_2$ content of 99.2% by weight or more and 99.4% by weight or less, and an average $SiO_2$ content of 99.2% by weight.

For the opaque crystalline quartz powder, opaque crystalline quartz powder having a particle size of 0.1 mm or less was used. In addition, for the opaque crystalline quartz powder, opaque crystalline quartz powder having a $SiO_2$ content of 99% by weight or more and less than 99.4% by weight, and an average $SiO_2$ content of 99.2% by weight was used.

The binder resin composition was manufactured as follows. An unsaturated polyester resin in which an unsaturated polyester polymer obtained by polycondensation of orthophthalic acid with a polyhydric alcohol and a styrene monomer were used in a weight ratio of 65:35 was used. Then, a binder resin composition was manufactured by mixing and dispersing 1.5 parts by weight of a tert-butyl peroxybenzoate thermal curing agent (TBPB, Trigonox C, akzo nobel) serving as a curing agent, 0.1 part by weight of a cobalt 6% catalyst (Hex-Cem, Borchers) serving as a catalyst and 3 parts by weight of a silane-based coupling agent on the basis of 100 parts by weight of the unsaturated polyester resin.

The light transmittance measurement method of the artificial marble sample is as follows. As the equipment used, the turbidimeter (NDH 5000 available from Nippon Denshoku) was used to measure the total transmittance. In this case, the total transmittance is a sum of a diffusion transmittance and a parallel transmittance. In Experimental Example 1, the total transmittance was measured using a sample with a size of 2 cm in width, 2 cm in length and 1.5 cm in thickness obtained by separating the base region and the stripe region of the artificial marble sample, respectively, and the surface of the sample was polished with the 3,000 grit-sandpaper and the backside was polished with 800 grit-sandpaper.

For the inorganic pigment, $TiO_2$, $NiO \cdot Sb_2O_3 \cdot 20TiO_2$, $Fe_2O_3$, $Fe_3O_4$, etc., which are inorganic pigments used when manufacturing artificial marbles, were purchased and used.

<Manufacture Example 1> Manufacture of Base Composition

The opaque crystalline quartz particles having an average $SiO_2$ content of 99.2% by weight were added and mixed well in the binder resin composition by using a planetary mixer. The opaque crystalline quartz powder having an average $SiO_2$ content of 99.2% by weight and the inorganic pigment were added and mixed well in the mixture to manufacture a base composition.

In this case, 600 parts by weight of the opaque crystalline quartz particles having an average $SiO_2$ content of 99.2% by weight, 300 parts by weight of the opaque crystalline quartz powder having an average $SiO_2$ content of 99.2% by weight and 3 parts by weight of the inorganic pigment were used on the basis of 100 parts by weight of the binder resin composition.

<Manufacture Example 2> Manufacture of Base Composition

The highly transparent crystalline quartz particles having an average $SiO_2$ content of 99.7% by weight were added and mixed well in the binder resin composition by using the planetary mixer. The highly transparent crystalline quartz powder having an average $SiO_2$ content of 99.4% by weight and the inorganic pigment were added and mixed well in the mixture to manufacture a base composition.

In this case, 600 parts by weight of the highly transparent crystalline quartz particles having an average $SiO_2$ content of 99.7% by weight, 300 parts by weight of the highly transparent crystalline quartz powder having an average $SiO_2$ content of 99.4% by weight and 3 parts by weight of the inorganic pigment were used on the basis of 100 parts by weight of the binder resin composition.

<Manufacture Example 3> Manufacture of Base Composition

The highly transparent amorphous fused silica particles were added and mixed well in the binder resin composition by using the planetary mixer. Then, the opaque crystalline quartz powder and the inorganic pigment were added and mixed well in the mixture to manufacture a base composition.

In this case, 600 parts by weight of the highly transparent amorphous fused silica particles having an average $SiO_2$ content of 99.7% by weight, 300 parts by weight of the opaque crystalline quartz powder having an average $SiO_2$ content of 99.2% by weight and 3 parts by weight of the inorganic pigment were used on the basis of 100 parts by weight of the binder resin composition.

<Manufacture Example 4> Manufacture of Base Composition

The highly transparent amorphous glass particles having a barium element content of 17% by weight were added and mixed well in the binder resin composition by using the planetary mixer. Then, the opaque crystalline quartz powder and the inorganic pigment were added and mixed well in the mixture to manufacture a base composition.

In this case, 600 parts by weight of the highly transparent amorphous glass particles having a barium element content of 17% by weight, 300 parts by weight of the opaque crystalline quartz powder having an average $SiO_2$ content of 99.2% by weight and 3 parts by weight of the inorganic pigment were used on the basis of 100 parts by weight of the binder resin composition.

Example 1

The highly transparent amorphous fused silica particles were added and mixed well in the binder resin composition by using the planetary mixer. Then, the highly transparent crystalline quartz powder was added and mixed well in the mixture to manufacture a stripe composition. In this case, 600 parts by weight of the highly transparent amorphous fused silica particles having an average $SiO_2$ content of 99.7% by weight, and 300 parts by weight of the highly transparent crystalline quartz powder having an average $SiO_2$ content of 99.7% by weight were used on the basis of 100 parts by weight of the binder resin composition.

The base composition of Manufacture Example 1 was put into a rubber mold, and the top of the base composition was scraped using a robot to remove a part of the base composition, thereby forming a groove. After putting the stripe composition into the groove, compression molding was performed using vacuum press equipment. Then, the molded composition was cured at 120° C. for 1 hour, and after the curing was completed, the cured composition was cooled to room temperature, and then taken out of the mold to manufacture an artificial marble. After cutting the artificial marble on all sides, the surface was polished smoothly to manufacture an artificial marble sample.

Example 2

A stripe composition was manufactured in the same manner as in Example 1, except that highly transparent amorphous glass particles having a barium element content of 17% by weight were used instead of the highly transparent amorphous fused silica particles when manufacturing the stripe composition in Example 1.

An artificial marble sample having a stripe pattern was manufactured using the base composition of Manufacture Example 1 in the same manner as in Example 1.

Example 3

A stripe composition was manufactured in the same manner as in Example 1, except that highly transparent crystalline quartz particles having an average $SiO_2$ content of 99.7% by weight were used instead of the highly transparent amorphous fused silica particles when manufacturing the stripe composition in Example 1.

An artificial marble sample having a stripe pattern was manufactured using the base composition of Manufacture Example 1 in the same manner as in Example 1.

Example 4

A stripe composition was manufactured in the same manner as in Example 1, except that highly transparent crystalline quartz powder having an average $SiO_2$ content of 99.5% by weight was used instead of the highly transparent crystalline quartz powder having an average $SiO_2$ content of 99.7% by weight when manufacturing the stripe composition in Example 1.

An artificial marble sample having a stripe pattern was manufactured using the base composition of Manufacture Example 1 in the same manner as in Example 1.

Example 5

A stripe composition was manufactured in the same manner as in Example 2, except that highly transparent crystalline quartz powder having an average $SiO_2$ content of 99.5% by weight was used instead of the highly transparent crystalline quartz powder having an average $SiO_2$ content of 99.7% by weight when manufacturing the stripe composition in Example 2.

An artificial marble sample having a stripe pattern was manufactured using the base composition of Manufacture Example 1 in the same manner as in Example 2.

Example 6

A stripe composition was manufactured in the same manner as in Example 3, except that highly transparent crystalline quartz powder having an average $SiO_2$ content of 99.5% by weight was used instead of the highly transparent crystalline quartz powder having an average $SiO_2$ content of 99.7% by weight when manufacturing the stripe composition in Example 3.

An artificial marble sample having a stripe pattern was manufactured using the base composition of Manufacture Example 1 in the same manner as in Example 3.

Example 7

An artificial marble sample having a stripe pattern was manufactured in the same manner as in Example 2, except that the base composition of Manufacture Example 2 was used instead of the base composition of Manufacture Example 1.

Example 8

An artificial marble sample having a stripe pattern was manufactured in the same manner as in Example 1, except that the base composition of Manufacture Example 3 was used instead of the base composition of Manufacture Example 1.

Example 9

An artificial marble sample having a stripe pattern was manufactured in the same manner as in Example 1, except that the base composition of Manufacture Example 4 was used instead of the base composition of Manufacture Example 1.

Example 10

The highly transparent amorphous fused silica particles were added and mixed well in the binder resin composition by using the planetary mixer. Then, the highly transparent crystalline quartz powder was added and mixed well in the mixture. Thereafter, a stripe composition was manufactured by adding a pigment containing $TiO_2$ and gently mixing with the planetary mixer (speed of 2 or less, rotation number of 5 or less) so as not to mix uniformly. In this case, 600 parts by weight of the highly transparent amorphous fused silica particles having an average $SiO_2$ content of 99.7% by weight, and 300 parts by weight of the highly transparent crystalline quartz powder having an average $SiO_2$ content of 99.7% by weight were used on the basis of 100 parts by weight of the binder resin composition. In addition, 0.3% by weight of the inorganic pigment was used based on 100% by weight of the stripe composition.

The base composition of Manufacture Example 1 was put into a rubber mold, and the top of the base composition was scraped using a robot to remove a part of the base composition, thereby forming a groove. After putting the stripe composition into the groove, compression molding was performed using vacuum press equipment. Then, the molded composition was cured at 120° C. for 1 hour, and after the curing was completed, the cured composition was cooled to room temperature, and then taken out of the mold to manufacture an artificial marble. After cutting the artificial marble on all sides, the surface was polished smoothly to manufacture an artificial marble sample.

That is, Example 10 is an Example using a stripe composition manufactured by adding a pigment to the stripe composition of Example 1 and mixing them non-uniformly.

Example 11

A stripe composition was manufactured in the same manner as in Example 10, except that highly transparent amorphous glass particles having a barium element content of 17% by weight were used instead of the highly transparent amorphous fused silica particles when manufacturing the stripe composition in Example 10.

An artificial marble sample having a stripe pattern was manufactured using the base composition of Manufacture Example 1 in the same manner as in Example 10.

That is, Example 11 is an Example using a stripe composition manufactured by adding a pigment to the stripe composition of Example 2 and mixing them non-uniformly.

Comparative Example 1

A stripe composition was manufactured in the same manner as in Example 1, except that transparent crystalline quartz powder having an average $SiO_2$ content of 99.4% by weight was used instead of the highly transparent crystalline quartz powder having an average $SiO_2$ content of 99.7% by weight when manufacturing the stripe composition in Example 1.

An artificial marble sample having a stripe pattern was manufactured using the base composition of Manufacture Example 1 in the same manner as in Example 1.

Comparative Example 2

A stripe composition was manufactured in the same manner as in Comparative Example 1, except that highly transparent amorphous glass particles having a barium element content of 17% by weight were used instead of the highly transparent amorphous fused silica particles when preparing the stripe composition in Comparative Example 1.

An artificial marble sample having a stripe pattern was manufactured using the base composition of Manufacture Comparative 1 in the same manner as in Comparative Example 1.

Comparative Example 3

A stripe composition was manufactured in the same manner as in Comparative Example 1, except that highly transparent crystalline quartz particles having an average $SiO_2$ content of 99.7% by weight were used instead of the highly transparent amorphous fused silica particles when manufacturing the stripe composition in Comparative Example 1.

An artificial marble sample having a stripe pattern was manufactured using the base composition of Manufacture Comparative 1 in the same manner as in Comparative Example 1.

Comparative Example 4

A stripe composition was manufactured in the same manner as in Comparative Example 1, except that opaque crystalline quartz powder having an average $SiO_2$ content of 99.2% by weight was used instead of the highly transparent crystalline quartz powder when manufacturing the stripe composition in Comparative Example 1.

An artificial marble sample having a stripe pattern was manufactured using the base composition of Manufacture Comparative 1 in the same manner as in Comparative Example 1.

Comparative Example 5

A stripe composition was manufactured in the same manner as in Comparative Example 2, except that opaque crystalline quartz powder having an average $SiO_2$ content of 99.2% by weight was used instead of the highly transparent crystalline quartz powder when manufacturing the stripe composition in Comparative Example 2.

An artificial marble sample having a stripe pattern was manufactured using the base composition of Manufacture Example 1 in the same manner as in Comparative Example 2.

Comparative Example 6

A stripe composition was manufactured in the same manner as in Comparative Example 3, except that opaque crystalline quartz powder having an average $SiO_2$ content of 99.2% by weight was used instead of the highly transparent crystalline quartz powder when manufacturing the stripe composition in Comparative Example 3.

In the same manner as in Comparative Example 3, an artificial marble sample having a stripe pattern was manufactured using the base composition of Manufacture Example 1.

Comparative Example 7

A stripe composition was manufactured in the same manner as in Example 1, except that highly transparent amorphous glass particles not containing a barium element were used instead of the highly transparent amorphous fused silica particles when manufacturing the stripe composition in Example 1, and transparent crystalline quartz powder having an average SiO$_2$ content of 99.4% by weight was used instead of the highly transparent crystalline quartz powder having an average SiO$_2$ content of 99.7% by weight.

An artificial marble sample having a stripe pattern was manufactured using the base composition of Manufacture Example 1 in the same manner as in Example 1.

Comparative Example 8

A stripe composition was manufactured in the same manner as in Example 1, except that highly transparent amorphous glass particles not containing a barium element were used instead of the highly transparent amorphous fused silica particles when manufacturing the stripe composition in Example 1, and opaque crystalline quartz powder having an average SiO$_2$ content of 99.2% by weight were used instead of the highly transparent crystalline quartz powder having an average SiO$_2$ content of 99.7% by weight.

An artificial marble sample having a stripe pattern was manufactured using the base composition of Manufacture Example 1 in the same manner as in Example 1.

Comparative Example 9

A stripe composition was manufactured in the same manner as in Example 1, except that opaque crystalline quartz particles having an average SiO$_2$ content of 99.2% by weight were used instead of the highly transparent amorphous fused silica particles when manufacturing the stripe composition in Example 1.

An artificial marble sample having a stripe pattern was manufactured using the base composition of Manufacture Example 1 in the same manner as in Example 1.

Comparative Example 10

A stripe composition was manufactured in the same manner as in Comparative Example 9, except that highly transparent crystalline quartz powder having an average SiO$_2$ content of 99.5% by weight were used instead of the highly transparent crystalline quartz powder having an average SiO$_2$ content of 99.7% by weight when manufacturing the stripe composition in Comparative Example 9.

An artificial marble sample having a stripe pattern was manufactured using the base composition of Manufacture Example 1 in the same manner as in Comparative Example 9.

Comparative Example 11

A stripe composition was manufactured in the same manner as in Comparative Example 9, except that transparent crystalline quartz powder having an average SiO$_2$ content of 99.4% by weight was used instead of the highly transparent crystalline quartz powder having an average SiO$_2$ content of 99.7% by weight when manufacturing the stripe composition in Comparative Example 9.

An artificial marble sample having a stripe pattern was manufactured using the base composition of Manufacture Example 1 in the same manner as in Comparative Example 9.

That is, in Examples 1 to 6 and Comparative Examples 1 to 11, only the compositions of the stripe compositions were different, and the base compositions were the same (the base composition of Manufacture Example 1 was used). In addition, in Examples 1 to 6 and Comparative Examples 1 to 11, the artificial marble samples having stripe patterns were manufactured by using the base composition and the stripe composition in the same manner.

Further, in Example 2 and Example 7, only the compositions of the base compositions were different, and the stripe compositions were the same.

Further, in Example 1 and Examples 8 and 9, only the compositions of the base compositions were different, and the stripe compositions were the same.

In all of the above Examples and Comparative Examples, the thickness of the artificial marble sample was 20 mm, the thickness of the stripe regions varied from 5 mm to 20 mm, and the width of the stripe region on the surface of the artificial marble was 10 cm.

The weight ratios of the materials of the stripe compositions used in the artificial marble samples are as follows (Table 1). In Table 1, the SiO$_2$ content is an average value of SiO$_2$ contents in particles or powder.

TABLE 1

| | | inorganic particles | | | | | powder | | | |
|---|---|---|---|---|---|---|---|---|---|---|
| | Binder resin composition | Highly transparent amorphous fused silica particles (SiO$_2$ 99.7%) | Highly transparent amorphous glass particles (Ba element 17% by weight) | Highly transparent amorphous glass particles (Ba element not contained) | Highly transparent crystalline quartz particles (SiO$_2$ 99.7%) | opaque crystalline quartz particles (SiO$_2$ 99.2%) | Highly transparent crystalline quartz powder (SiO$_2$ 99.7%) | Highly transparent crystalline quartz powder (SiO$_2$ 99.5%) | Transparent crystalline quartz powder (SiO$_2$ 99.4%) | Opaque crystalline quartz powder (SiO$_2$ 99.2%) |
| Examples 1, 8, 9 | To 100 | 600 | | | | | 300 | | | |
| Examples 2, 7 | To 100 | | 600 | | | | 300 | | | |
| Example 3 | To 100 | | | | 600 | | 300 | | | |
| Example 4 | To 100 | 600 | | | | | | 300 | | |
| Example 5 | To 100 | | 600 | | | | | 300 | | |
| Example 6 | To 100 | | | | 600 | | | 300 | | |

TABLE 1-continued

| | Binder resin composition | inorganic particles | | | | | powder | | | |
|---|---|---|---|---|---|---|---|---|---|---|
| | | Highly transparent amorphous fused silica particles (SiO$_2$ 99.7%) | Highly transparent amorphous glass particles (Ba element 17% by weight) | Highly transparent amorphous glass particles (Ba element not contained) | Highly transparent crystalline quartz particles (SiO$_2$ 99.7%) | opaque crystalline quartz particles (SiO$_2$ 99.2%) | Highly transparent crystalline quartz powder (SiO$_2$ 99.7%) | Highly transparent crystalline quartz powder (SiO$_2$ 99.5%) | Transparent crystalline quartz powder (SiO$_2$ 99.4%) | Opaque crystalline quartz powder (SiO$_2$ 99.2%) |
| Comparative Example 1 | To 100 | 600 | | | | | | | 300 | |
| Comparative Example 2 | To 100 | | 600 | | | | | | 300 | |
| Comparative Example 3 | To 100 | | | | 600 | | | | 300 | |
| Comparative Example 4 | To 100 | 600 | | | | | | | | 300 |
| Comparative Example 5 | To 100 | | 600 | | | | | | | 300 |
| Comparative Example 6 | To 100 | | | | 600 | | | | | 300 |
| Comparative Example 7 | To 100 | | | 600 | | | | | 300 | |
| Comparative Example 8 | To 100 | | | 600 | | | | | | 300 |
| Comparative Example 9 | To 100 | | | | | 600 | 300 | | | |
| Comparative Example 10 | To 100 | | | | | 600 | | 300 | | |
| Comparative Example 11 | To 100 | | | | | 600 | | | 300 | |
| Manufacture Example 1 (base composition) | To 100 | | | | | 600 | | | | 300 |
| Manufacture Example 2 (base composition) | To 100 | | | | 600 | | | | 300 | |
| Manufacture Example 3 (base composition) | To 100 | 600 | | | | | | | | 300 |
| Manufacture Example 4 (base composition) | To 100 | | 600 | | | | | | | 300 |

Experimental Example 1

For the artificial marble samples of Examples 1 to 6 and Comparative Examples 1 to 11, the light transmittance of the stripe region was measured using the turbidimeter (NDH 5000 available from Nippon Denshoku). The stripe regions of the artificial marble samples of Examples 7 to 9 were the same as those of Examples 1 or 2, and thus were omitted. As a result, all of the artificial marble samples of Examples 1 to 6 showed excellent total transmittance in the stripe region, exceeding 6.00%. However, all of the Comparative Examples showed low total transmittance in the stripe region.

Since the base compositions forming the stripe regions of Examples 1 to 6 and Comparative Examples 1 to 11 were all the same, as a result of measuring the total transmittance of the sample of the base region of Example 1, the total transmittance of the base region was 0%. In addition, as a result of measuring the total transmittance of each sample of the base regions of Examples 7 to 9, the total transmittance of Examples 7 to 9 was very low (Table 2).

TABLE 2

| | Total transmittance (%) |
|---|---|
| Example 1 | 8.09 |
| Example 2 | 12.79 |
| Example 3 | 7.56 |
| Example 4 | 6.99 |
| Example 5 | 10.17 |
| Example 6 | 7.02 |
| Comparative Example 1 | 4.88 |
| Comparative Example 2 | 5.02 |
| Comparative Example 3 | 3.51 |
| Comparative Example 4 | 4.37 |
| Comparative Example 5 | 4.75 |
| Comparative Example 6 | 3.19 |
| Comparative Example 7 | 4.33 |
| Comparative Example 8 | 4.24 |
| Comparative Example 9 | 3.88 |
| Comparative Example 10 | 3.11 |
| Comparative Example 11 | 2.24 |
| Base region of Example 1 | 0 |

TABLE 2-continued

| | Total transmittance (%) |
|---|---|
| Base region of Example 7 | 3.51 |
| Base region of Example 8 | 2.84 |
| Base region of Example 9 | 3.58 |

Experimental Example 2

The artificial marble samples of Examples 1 to 6 and Comparative Examples 1 to 11 were illuminated with the backlight behind the stripe region and observed in front of the samples with the naked eye. In this case, for the artificial marble sample, a sample with a width of 2 cm, a length of 2 cm and a thickness of 1.5 cm obtained by separating each of the base region and the stripe region from the artificial marble was used. The backlight illuminated the artificial marble with 60 lumens of light in a state of being in contact with the artificial marble, and the LED backlight of the smartphone (Samsung Galaxy S7) was used as the light source.

Then, the luminance was measured at a height of about 5 cm above the surface of the artificial marble by using the luminance meter (Luminance Meter LS-160 available from Konica Minolta). In this case, the stripe regions of the artificial marble samples of Examples 7 to 9 were the same as that of Example 1 or 2 and were thus omitted.

As a result, all of the artificial marble samples of Examples 1 to 6 showed excellent luminance in the stripe region, exceeding 1000 cd/m². However, all of the Comparative Examples showed low luminance in the stripe region.

Since the base compositions forming the base regions of Examples 1 to 6 and Comparative Examples 1 to 11 were all the same, as a result of measuring the luminance of the sample of the base region of Example 1 in the same manner, the luminance of the base region was very low. In addition, as a result of measuring the luminance of each of the samples of the base region of Examples 7 to 9, the luminance was also very low (Table 3).

TABLE 3

| | Luminance (cd/m²) |
|---|---|
| Example 1 | 1250 |
| Example 2 | 1411 |
| Example 3 | 1204 |
| Example 4 | 1013 |
| Example 5 | 1402 |
| Example 6 | 1004 |
| Comparative Example 1 | 165 |
| Comparative Example 2 | 320 |
| Comparative Example 3 | 150 |
| Comparative Example 4 | 210 |
| Comparative Example 5 | 203 |
| Comparative Example 6 | 181 |
| Comparative Example 7 | 279 |
| Comparative Example 8 | 251 |
| Comparative Example 9 | 142 |
| Comparative Example 10 | 101 |
| Comparative Example 11 | 83 |
| Base region of Example 1 | 72 |
| Base region of Example 7 | 150 |
| Base region of Example 9 | 173 |
| Base region of Example 10 | 146 |

Experimental Example 3

An X-ray scan was performed on the stripe regions of the artificial marble samples of Examples 1 to 3.

The imaging result of the X-ray scan is shown in FIG. 3. In the case of the stripe region of the artificial marble of Example 2 containing the highly transparent amorphous glass particles containing the barium element, it was confirmed that the stripe region appeared bluish as a result of X-ray imaging. However, it was confirmed that the stripe regions of the artificial marbles of Examples 1 and 3 not containing glass particles appeared greenish as a result of X-ray imaging.

Experimental Example 4

The artificial marble samples of Examples 1 to 9 and Comparative Examples 1 to 11 were observed with the naked eye. When observing the artificial marble from the outside with the naked eye, the visibility was evaluated for the section where the stripe region was located on the surface of the artificial marble sample but the base region was present under the stripe region.

As a result, in Examples 1 to 9, the base region under the stripe region was observed with the naked eye, and it was observed that the stripe looked blurry as the distance from the stripe region on the surface of the artificial marble increased. However, in the case of the Comparative Examples, the base region under the stripe region was not visible. This was deemed to be because the stripe regions of the comparative examples were opaque (Table 4)

TABLE 4

| | Whether the base region under the stripe region is visible |
|---|---|
| Example 1 | ○ |
| Example 2 | ○ |
| Example 3 | ○ |
| Example 4 | ○ |
| Example 5 | ○ |
| Example 6 | ○ |
| Example 7 | ○ |
| Example 8 | ○ |
| Example 9 | ○ |
| Comparative Example 1 | x |
| Comparative Example 2 | x |
| Comparative Example 3 | x |
| Comparative Example 4 | x |
| Comparative Example 5 | x |
| Comparative Example 6 | x |
| Comparative Example 7 | x |
| Comparative Example 8 | x |
| Comparative Example 9 | x |
| Comparative Example 10 | x |
| Comparative Example 11 | x |

○: The base region under the stripe region is observed with the naked eye,
x: The base region under the stripe region is not observed with the naked eye.

Experimental Example 5

The artificial marbles were manufactured by curing the stripe compositions of Examples 1 and 2 and then evaluated.

The stripe composition of Example 1 was put into a rubber mold having various depths and was subjected to compression molding using the vacuum press equipment. Then, the molded composition was cured at 120° C. for 1 hour, and after the curing was completed, the cured composition was cooled to room temperature, and then taken out of the mold to manufacture an artificial marble. After cutting the artificial marble on all sides, the surface was polished smoothly to manufacture artificial marble samples.

The stripe composition of Example 2 was also used in the same manner to manufacture artificial marble samples.

The transmittance of the artificial marble samples was measured using a Haze Meter NDH-5000 (Nippon Denshoku Industries Co., LTD), and the change in transmittance according to the thickness of the artificial marble samples was evaluated.

As a result, as the thickness of the artificial marble sample decreased, the transmittance increased in the form of an exponential function, and a difference in sense of depth of the stripe region (vein) occurred. In this case, the shapes of the trend lines of the artificial marble manufactured using the stripe composition of Example 1 and the artificial marble manufactured using the stripe composition of Example 2 were similar, but the transmittance of the artificial marble of Example 2 was higher (FIG. 4, ■: artificial marble manufactured using the stripe composition of Example 1, ♦: artificial marble manufactured using the stripe composition of Example 2).

Meanwhile, the thickness of the artificial marble manufactured using the stripe composition of Example 1 was made to increase at a constant rate so that the cross section had a trapezoidal shape (the thin part of the artificial marble was about 2 mm thick and the thick part was about 4 mm thick). In addition, the artificial marble of Example 2 was manufactured to have the thickness of about 2.5 mm. Then, the print was placed under the artificial marble samples whose thicknesses were adjusted, and a degree of see-through of letters on the print was evaluated. As a result, in the artificial marble manufactured using the stripe composition of Example 1, letters were seen-through at a part having a thickness of about 2 mm, but letters were not seen-through at a part having a thickness of about 4 mm. The artificial marble manufactured using the stripe composition of Example 2 exhibited an intermediate degree of see-through between the degrees of see-through of the two parts of the artificial marble manufactured using the stripe composition of Example 1 (FIG. 5).

The light reflectance of the artificial marble samples was measured using a spectrophotometer (CM-3500d, Konica Minolta), and the light reflectance of the artificial marble samples was measured as reflectance at a wavelength of 550 nm.

The results are shown in Table 5.

TABLE 5

| | Reflectance (@ 550 nm) |
|---|---|
| Example 1 | 30.59 |
| Example 2 | 23.08 |

Experimental Example 6

The stripe regions were obtained from the artificial marble samples of Examples 10 and 11, and the titanium content of the stripe regions was measured using XRF.

As a result, titanium was confirmed in the artificial marbles of Examples 10 and 11 (Table 6). Since the pigments containing titanium were not uniformly mixed, the stripe regions of the artificial marble, except for the portion with titanium, showed a transparent sense of depth, like the stripe regions of the artificial marbles of Examples 1 and 2, respectively, and rather, giving a transparency-emphasizing aesthetic sense due to the titanium pigment.

TABLE 6

| | Titanium content (% by weight) |
|---|---|
| Example 10 | 0.215 |
| Example 11 | 0.267 |

Experimental Example 7

The artificial marbles of Examples and Comparative Examples of the present invention were photographed and compared. It was confirmed that the artificial marble of Example 1 had transparent stripes on the dark base (FIG. 6). The artificial marble of Example 10 is shown in FIG. 7.

The base composition of Manufacture Example 1 (in this case, white pigment was used) was put into a rubber mold, and the top of the base composition was scraped using a robot to remove portions of the base composition, thereby forming grooves. The stripe composition of Example 2 and the stripe composition of Example 11 were put into the grooves, respectively, which was then subjected to compression molding using vacuum press equipment. Then, the molded composition was cured at 120° C. for 1 hour, and after the curing was completed, the cured composition was cooled to room temperature, and then taken out of the mold to manufacture an artificial marble. After cutting the artificial marble on all sides, the surface was polished smoothly to manufacture an artificial marble sample. That is, the artificial marble having the stripe region of Example 2 and the stripe region of Example 11 in the white opaque base region was manufactured, and the photograph is shown in FIG. 8.

In the meantime, the same composition as the base composition of Manufacture Example 1, except that a pigment was not used, was put into a rubber mold, which was then subjected to compression molding using vacuum press equipment. Then, the molded composition was cured at 120° C. for 1 hour, and after the curing was completed, the cured composition was cooled to room temperature, and then taken out of the mold to manufacture an artificial marble. After cutting the artificial marble on all sides, the surface was polished smoothly to manufacture an artificial marble sample, the photograph of which is shown in FIG. 9.

The invention claimed is:
1. An artificial marble comprising:
one or more stripe regions and a base region on a first surface of the artificial marble,
wherein the stripe regions extend into the artificial marble,
wherein the artificial marble comprises a section where a surface of the section corresponding to the first surface of the artificial marble is the stripe region and an inside of the artificial marble in a vertical direction under the stripe region is the base region,
wherein at least a part of the base region of the section is visible to a naked eye from the surface of the stripe region,
wherein the stripe region comprises 550 to 650 parts by weight of inorganic particles and 250 to 350 parts by weight of quartz powder on the basis of 100 parts by weight of a binder resin,
wherein the binder resin comprises an unsaturated polyester resin in an amount of 90% by weight or more, wherein the unsaturated polyester resin is manufactured using a composition comprising an unsaturated polyester polymer and a vinylic monomer in a weight ratio of 100:30 to 70, and wherein the quartz powder has an average $SiO_2$ content of 99.5% by weight or more and 100% by weight or less.

2. The artificial marble of claim 1, wherein the first surface of the artificial marble comprises one or more selected from the group consisting of a stripe region extending from one edge to another edge of the first surface, a stripe region that does not extend from one edge to another edge of the first surface, and a stripe region not located at an edge of the first surface.

3. The artificial marble of claim 1, wherein, in a case where a thickness of the stripe region is 5 mm, a total transmittance of the stripe region is 35% or greater and 60% or less when measured using a turbidimeter (NDH 5000 available from Nippon Denshoku).

4. The artificial marble of claim 1, wherein, in a case where a thickness of the stripe region is 10 mm, a total transmittance of the stripe region is 10% or greater and 40% or less when measured using a turbidimeter (NDH 5000 available from Nippon Denshoku).

5. The artificial marble of claim 1, wherein the inorganic particles are one or more selected from the group consisting of amorphous silica particles, glass particles containing a barium element, and crystalline quartz particles.

6. The artificial marble of claim 1, wherein the quartz powder has an average $SiO_2$ content of 99.6% by weight or more and 100% by weight or less.

7. The artificial marble of claim 1, wherein the inorganic particles are amorphous silica particles or crystalline quartz particles, and wherein the inorganic particles are inorganic particles having an average $SiO_2$ content of 99.5% by weight or more and 100% by weight or less.

8. The artificial marble of claim 1, wherein the inorganic particles are glass particles having a barium (Ba) element content of 10% by weight or more and 35% by weight or less based on 100% by weight of the inorganic particles.

9. The artificial marble of claim 1, wherein the inorganic particles are glass particles having a barium (Ba) element content of 5% by weight or more and 25% by weight or less based on 100% by weight of the stripe region.

10. The artificial marble of claim 1, wherein the stripe region of the artificial marble has a total transmittance of 6% or greater and 20% or less when the total transmittance is measured using a turbidimeter (NDH 5000 available from Nippon Denshoku) for a sample of a stripe region of an artificial marble with a size of 2 cm in width, 2 cm in length, and 1.5 cm in thickness obtained by separating a stripe region.

11. The artificial marble of claim 1, wherein the stripe region of the artificial marble has a luminance of 400 $cd/m^2$ or greater and 2000 $cd/m^2$ or less when a sample of a stripe region of an artificial marble with a size of 2 cm in width, 2 cm in length, and 1.5 cm in thickness obtained by separating a stripe region is illuminated with 60 lumens of light from a backlight in contact with the sample and the luminance is measured at a height of about 5 cm above a surface of the sample of the stripe region of the artificial marble by using a luminance meter (Luminance Meter LS-160 available from Konica Minolta), on a side of the sample opposite to a side in contact with the backlight.

12. The artificial marble of claim 1, wherein the base region comprises 500 to 700 parts by weight of inorganic particles and 200 to 400 parts by weight of quartz powder on the basis of 100 parts by weight of a binder resin, wherein the binder resin comprises an unsaturated polyester resin in an amount of 90% by weight or more, and wherein the stripe region comprises a pigment.

13. The artificial marble of claim 1, wherein a thickness of the stripe region is 0.03 mm or greater and 30 mm or smaller.

14. An artificial marble comprising:

one or more stripe regions and a base region on a first surface of the artificial marble, wherein the stripe regions extend into the artificial marble, wherein the artificial marble comprises at least one stripe region extending from the first surface to a second surface opposite to the first surface, a normal line drawn from the stripe region on the first surface passing through only the at least one stripe region without meeting the base region, wherein the stripe region comprises 550 to 650 parts by weight of inorganic particles and 250 to 350 parts by weight of quartz powder on the basis of 100 parts by weight of a binder resin, wherein the binder resin comprises an unsaturated polyester resin in an amount of 90% by weight or more, wherein the unsaturated polyester resin is manufactured using a composition comprising an unsaturated polyester polymer and a vinylic monomer in a weight ratio of 100:30 to 70, and wherein the quartz powder has an average $SiO_2$ content of 99.5% by weight or more and 100% by weight or less.

15. The artificial marble of claim 14, wherein the inorganic particles are one or more selected from the group consisting of amorphous silica particles, glass particles containing a barium element, and crystalline quartz particles.

16. The artificial marble of claim 14, wherein the quartz powder has an average $SiO_2$ content of 99.6% by weight or more and 100% by weight or less.

17. The artificial marble of claim 14, wherein the inorganic particles are amorphous silica particles or crystalline quartz particles, and wherein the inorganic particles are inorganic particles having an average $SiO_2$ content of 99.5% by weight or more and 100% by weight or less.

18. The artificial marble of claim 14, wherein the inorganic particles are glass particles having a barium (Ba) element content of 10% by weight or more and 35% by weight or less based on 100% by weight of the inorganic particles.

19. The artificial marble of claim 14, wherein the inorganic particles are glass particles having a barium (Ba) element content of 5% by weight or more and 25% by weight or less based on 100% by weight of the stripe region.

* * * * *